(12) United States Patent
Goyal et al.

(10) Patent No.: US 10,189,922 B2
(45) Date of Patent: Jan. 29, 2019

(54) VERY LOW DENSITY POLYETHYLENE PRODUCED WITH SINGLE SITE CATALYST

(71) Applicant: NOVA Chemicals (International) S.A., Fribourg (CH)

(72) Inventors: Shivendra Kumar Goyal, Calgary (CA); Bronwyn Hilary Gillon, Calgary (CA); Christopher John Brooke Dobbin, Calgary (CA); Stephen Salomons, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 5 days.

(21) Appl. No.: 15/501,881

(22) PCT Filed: Aug. 6, 2015

(86) PCT No.: PCT/IB2015/055995
§ 371 (c)(1),
(2) Date: Feb. 6, 2017

(87) PCT Pub. No.: WO2016/027194
PCT Pub. Date: Feb. 25, 2016

(65) Prior Publication Data
US 2017/0226244 A1    Aug. 10, 2017

Related U.S. Application Data

(60) Provisional application No. 62/038,965, filed on Aug. 19, 2014.

(51) Int. Cl.
| | |
|---|---|
| *C08F 210/16* | (2006.01) |
| *C08J 5/18* | (2006.01) |
| *C08L 23/08* | (2006.01) |
| *C08L 23/06* | (2006.01) |
| *B32B 27/08* | (2006.01) |
| *B32B 27/32* | (2006.01) |
| *B32B 7/02* | (2006.01) |

(52) U.S. Cl.
CPC ............. *C08F 210/16* (2013.01); *B32B 7/02* (2013.01); *B32B 27/08* (2013.01); *B32B 27/327* (2013.01); *C08J 5/18* (2013.01); *C08L 23/06* (2013.01); *C08L 23/0815* (2013.01); *B32B 2307/72* (2013.01); *B32B 2553/00* (2013.01); *C08F 2500/08* (2013.01); *C08F 2500/26* (2013.01); *C08J 2323/08* (2013.01); *C08L 2203/16* (2013.01); *C08L 2205/02* (2013.01)

(58) Field of Classification Search
CPC ............. C08F 210/16; C08F 2500/08; C08F 2500/26; C08J 5/18; C08J 2323/08; C08L 23/0815; C08L 23/06; C08L 2205/02; C08L 2203/16; B32B 27/08; B32B 27/327; B32B 7/02; B32B 2307/72; B32B 2553/00
See application file for complete search history.

(56) References Cited

U.S. PATENT DOCUMENTS

| 6,984,695 B2 | 1/2006 | Brown et al. | |
|---|---|---|---|
| 8,497,325 B2 | 7/2013 | Tse et al. | |
| 2013/0029125 A1* | 1/2013 | Tse et al. | ................ C08L 23/04 428/220 |

FOREIGN PATENT DOCUMENTS

| WO | 2006/113983 A1 | 11/2006 |
|---|---|---|
| WO | 2013/151687 A1 | 10/2013 |

OTHER PUBLICATIONS

ASTM D 5748-95 (Reapproved 2012); Standard Test Method for Protrusion Puncture Resistance of Stretch Wrap Film; Copyright ASTM International; Current edition approved Apr. 1, 2012. Published May 2012. Originally approved in 1995. Last previous edition approved in 2007 as D5748-95 (2007). pp. 1-4.

ASTM F 1921-98; Standard Test Methods for Hot Seal Strength (Hot Tack) of Thermoplastic Polymers and Blends Comprising the Sealing Surfaces of Flexible Webs; Copyright ASTM International; Current edition approved Oct. 10, 1998. Published Feb. 1999. pp. 1-6.

ASTM D6474-99 (Reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D 792-00; Standard Test Methods for Density and Specific Gravity (Relative Density) of Plastics by Displacement; Copyright ASTM International; Current edition approved Dec. 10, 2000. Published Mar. 2001. Originally published as D 792-44. Last previous edition D 792-98. pp. 1-6.

ASTM D 1709-04; Standard Test Methods for Impact Resistance of Plastic Film by the Free-Falling Dart Method; Copyright ASTM International; Current edition approved Oct. 1, 2004. Published Oct. 2004. Originally approved in 1959. Last previous edition approved in 2003 as D 1709-03. pp. 1-9.

ASTM D 1922-09; Standard Test Method for Propagation Tear Resistance of Plastic Film and Thin Sheeting by Pendulum Method; Copyright ASTM International; Current edition approved May 1, 2009. Published Jun. 2009. Originally approved in 1961. Last previous edition approved in 2008 as D1922-08. pp. 1-7.

(Continued)

*Primary Examiner* — Nathan M Nutter
(74) *Attorney, Agent, or Firm* — Julie L. Heinrich

(57) ABSTRACT

Provided herein are VLDPE polymer compositions suitable for use in the manufacture of flexible films or sheets. In one embodiment, the copolymer comprises a polyethylene VLDPE resin with $M_z/M_w$ of greater than 2, $CDBI_{50}$ of greater than 55 and a single melting peak in DSC measurement. The polymer compositions disclosed herein may be suitable for use in the manufacture of films with improved balance of film toughness, processability and sealability in monolayer and multi-layer film structures.

47 Claims, 8 Drawing Sheets

(56) References Cited

OTHER PUBLICATIONS

ASTM F88/F88M-09; Standard Test Method for Seal Strength of Flexible Barrier Materials; Copyright ASTM International; Current edition approved Jun. 15, 2009. Published Jul. 2009. Originally approved in 1968. Last previous edition approved in 2007 as F88-07a. pp. 1-6.

ASTM D3418-12d; Standard Test Method for Transition Temperatures and Enthalpies of Fusion and Crystallization of Polymers by Differential Scanning Calorimetry; Copyright ASTM International; Current edition approved Aug. 1, 2012. Published Sep. 2012. Originally approved in 1975. Last previous edition approved in 2008 as D3418-08. pp. 1-7.

ASTM D1238-13; Standard Test Method for Melt Flow Rates of Thermoplastics by Extrusion Plastometer; Copyright ASTM International; Current edition approved Aug. 1, 2013. Published Aug. 2013. Originally approved in 1965. Last previous edition approved in 2010 as D1238-10. pp. 1-16.

* cited by examiner

VERY LOW DENSITY POLYETHYLENE PRODUCED WITH SINGLE SITE CATALYST

TECHNICAL FIELD

The present disclosure relates to ethylene copolymers, copolymer compositions and methods of making and using the same.

BACKGROUND ART

Today's commercially available metallocene catalyzed very low density polyethylene (VLDPE) resins produced in a gas phase process provide high film toughness (Dart Impact Strength>450 g/mil for a 1 mil monolayer film), but tend to have a number of drawbacks. Due to their narrow molecular weight distributions, these resins have difficulty in conversion to finished products and a tendency for films made from these resins to split in the machine direction. In addition, both the metallocene catalyzed VLDPE resins produced in a gas phase process and the Ziegler-Natta (Z-N) catalyzed VLDPE resins demonstrate non-homogeneous melting of the VLDPE copolymer, i.e. exhibiting at least two peaks in the Differential Scanning Calorimetry (DSC) measurement.

A need exists for a single site catalyzed VLDPE resin having high film toughness properties that is relatively easy to process or convert into finished product. Furthermore, a need exists for a VLDPE copolymer that has uniform melting behavior, i.e. exhibiting a single peak in a DSC measurement.

DISCLOSURE OF INVENTION

Provided is an ethylene copolymer having a density from about 0.890 to about 0.915 g/cm$^3$, a molecular weight distribution $M_w/M_n$ from about 2.2 to about 4.5, a molecular weight distribution $M_z/M_w$ of greater than 2, provided that when the $M_z/M_w$ is greater than 3, the copolymer further has a normal to flat comonomer distribution, a CDBI$_{50}$ from about 55 to about 98, and a single peak in a DSC measurement.

Also provided is an ethylene copolymer having a density from about 0.890 to about 0.915 g/cm$^3$, a molecular weight distribution $M_w/M_n$ from about 2.2 to about 4.5, a molecular weight distribution $M_z/M_w$ from about 2 to about 3, a CDBI$_{50}$ from about 55 to about 98, and a single peak in a DSC measurement.

Also provided is an ethylene copolymer having a density from about 0.890 to about 0.915 g/cm$^3$, a molecular weight distribution $M_w/M_n$ of from about 2.2 to about 4.5, a molecular weight distribution $M_z/M_w$ of greater than 2, a normal to flat comonomer distribution, a CDBI$_{50}$ from about 55 to about 98, and a single peak in a DSC measurement.

Also provided is an ethylene copolymer having a density from about 0.890 to about 0.915 g/cm$^3$, a molecular weight distribution $M_w/M_n$ of from about 2.2 to about 4.5, a molecular weight distribution $M_z/M_w$ of greater than 3, a normal to flat comonomer distribution, a CDBI$_{50}$ from about 55 to about 98, and a single peak in a DSC measurement.

Also provided is an ethylene copolymer as described herein made from ethylene and one or more C$_{3-12}$ alpha olefin comonomers in a continuous polymerization process.

Also provided are polymer compositions comprising the ethylene copolymer described herein. In some embodiments the ethylene copolymers and the polymer compositions may be blended with a low density polyethylene (LDPE), a high density polyethylene (HDPE), a linear low density polyethylene (LLDPE), a very low density polyethylene (VLDPE) or an ultra low density polyethylene (ULDPE).

Also provided are films, monolayer and multilayer films, comprising the ethylene copolymer and/or polymer compositions made therefrom.

Also provided are packaging articles comprising the ethylene copolymer and/or polymer compositions made therefrom.

BEST MODE FOR CARRYING OUT THE INVENTION

Figure 1:
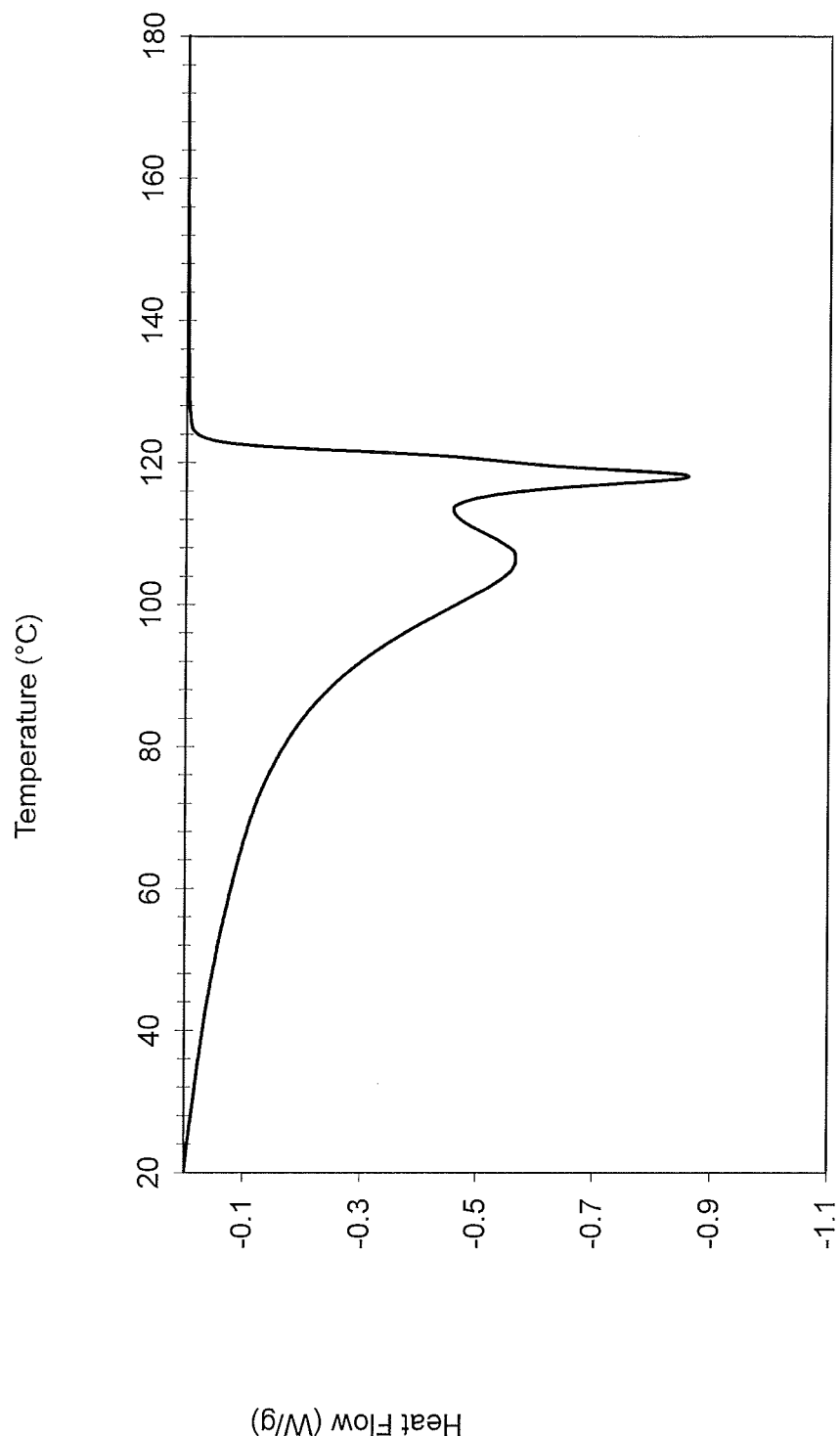
FIG. 1: DSC Profile Measurements for Exceed™ 1015HA
Figure 2:
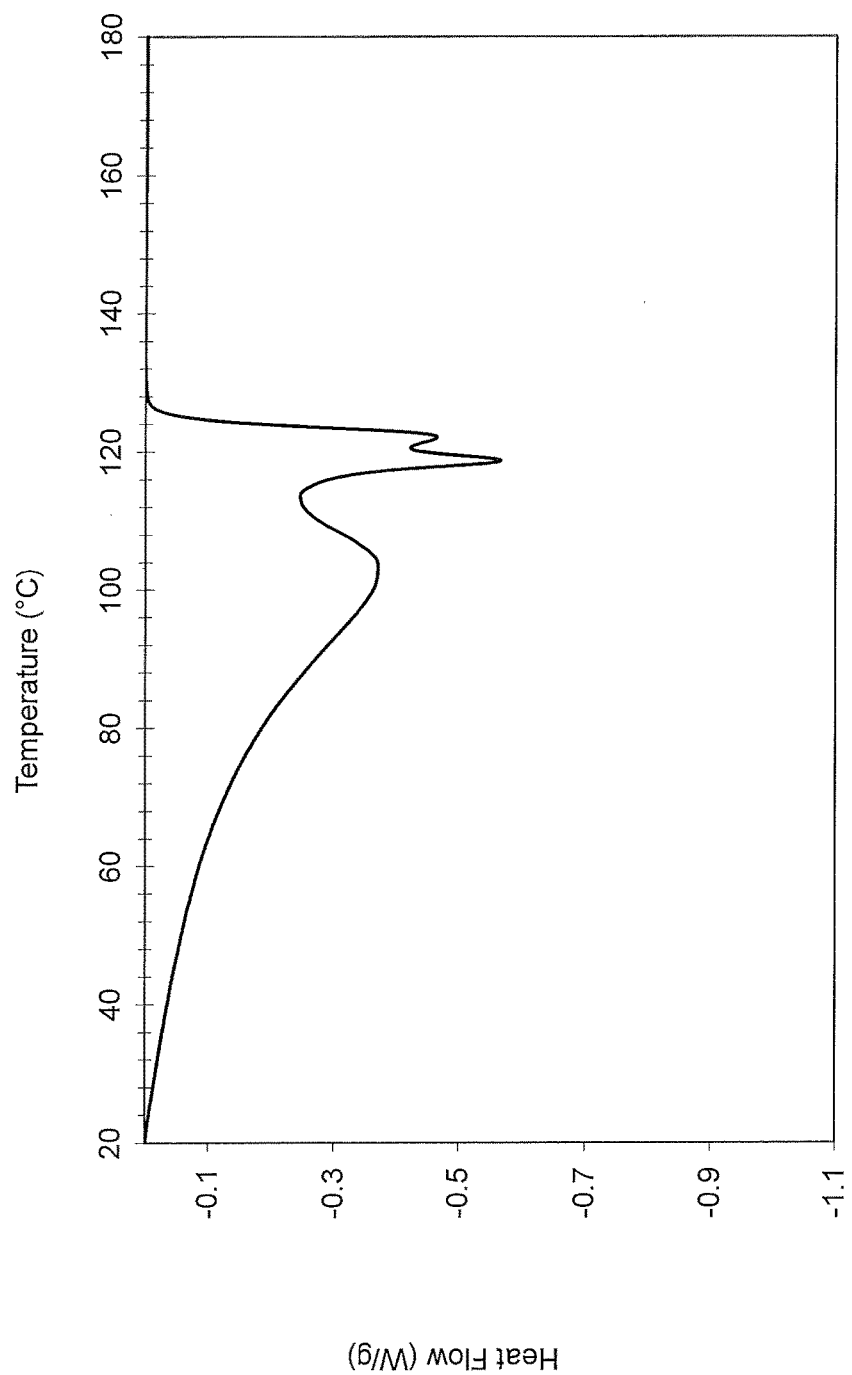
FIG. 2: DSC Profile Measurements for SCLAIR® FP112-A
Figure 3:
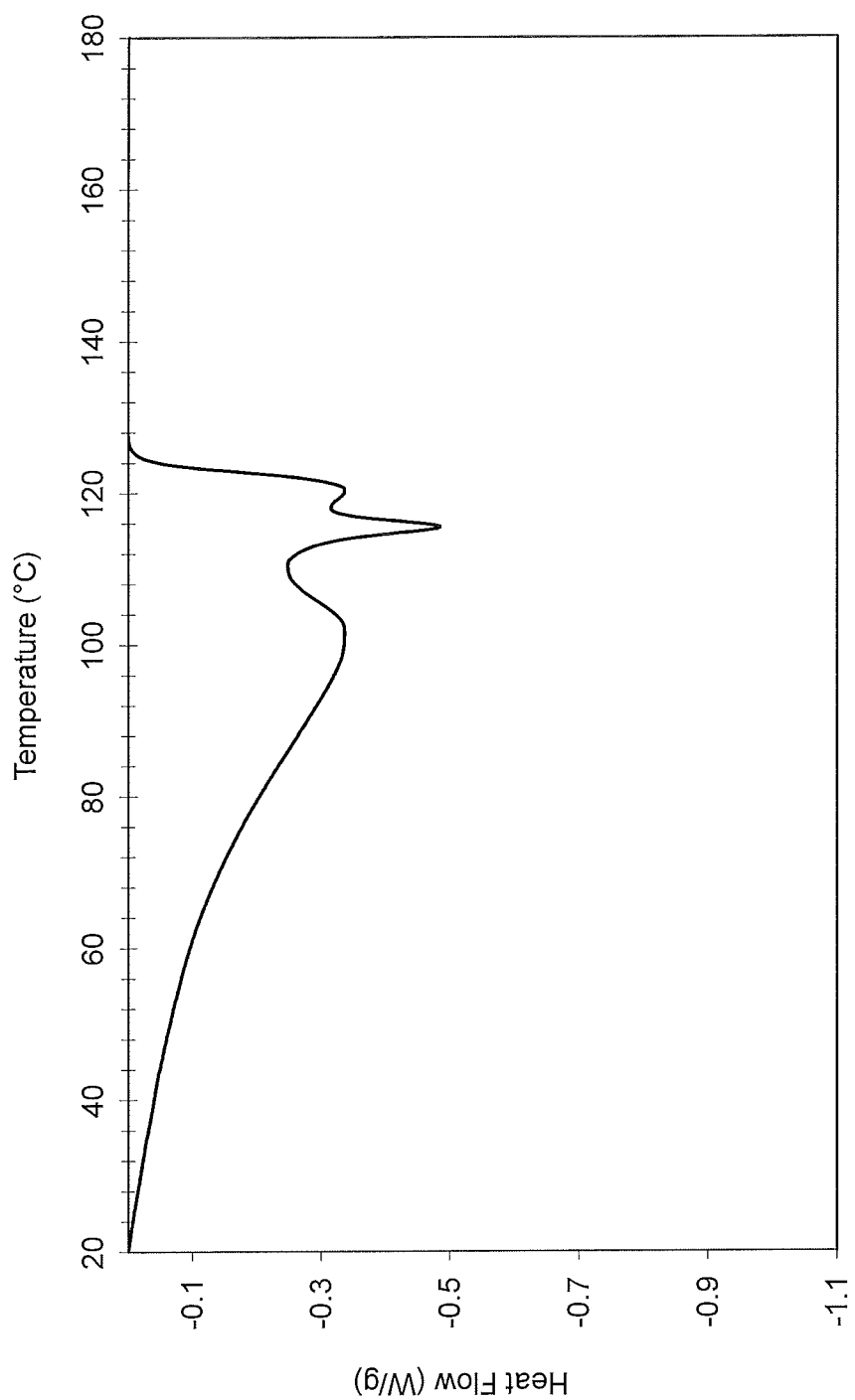
FIG. 3: DSC Profile Measurements for Evolue™ SP 2020
Figure 4:
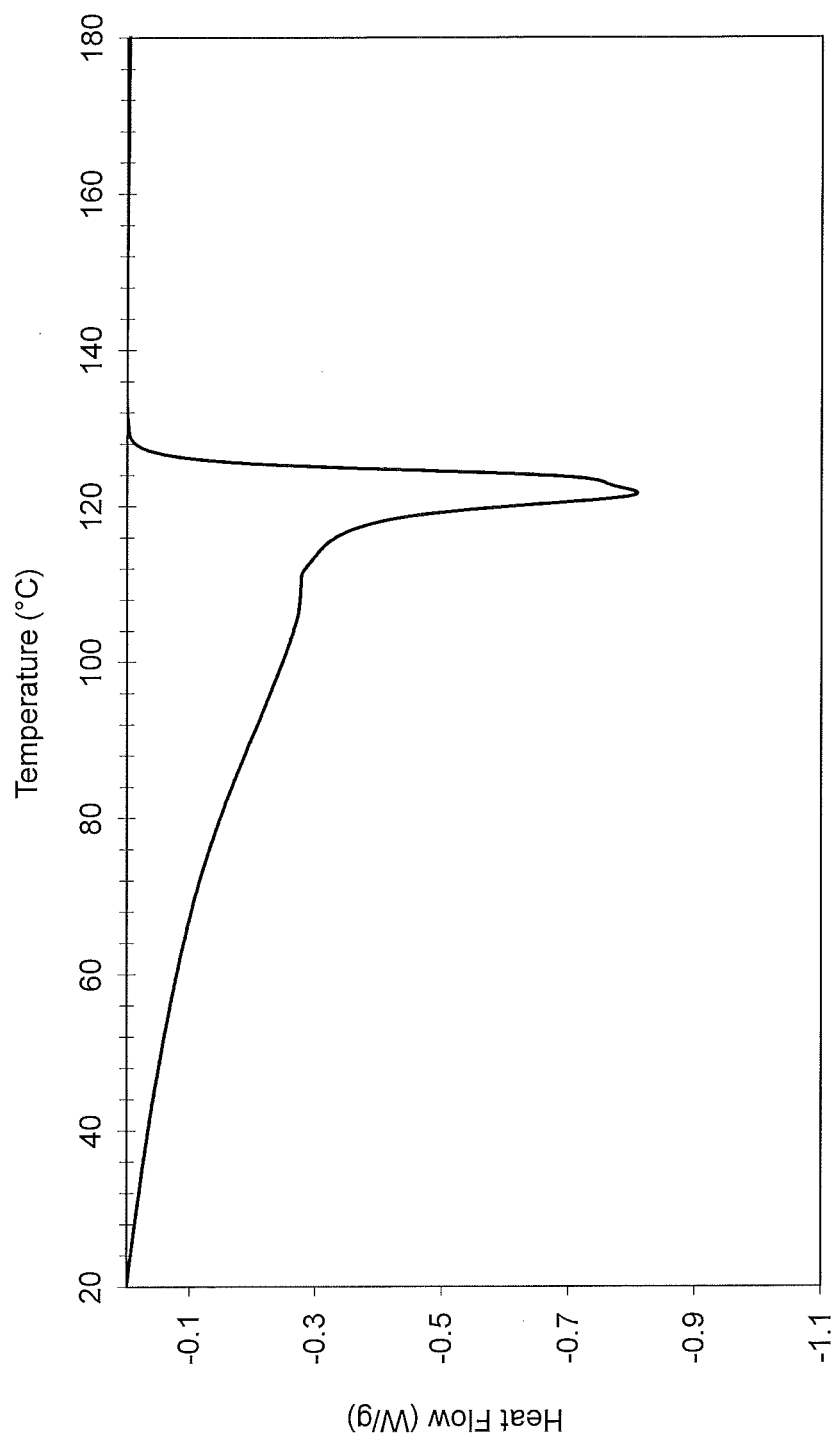
FIG. 4: DSC Profile Measurements for MXSTEN® CV77516
Figure 5:
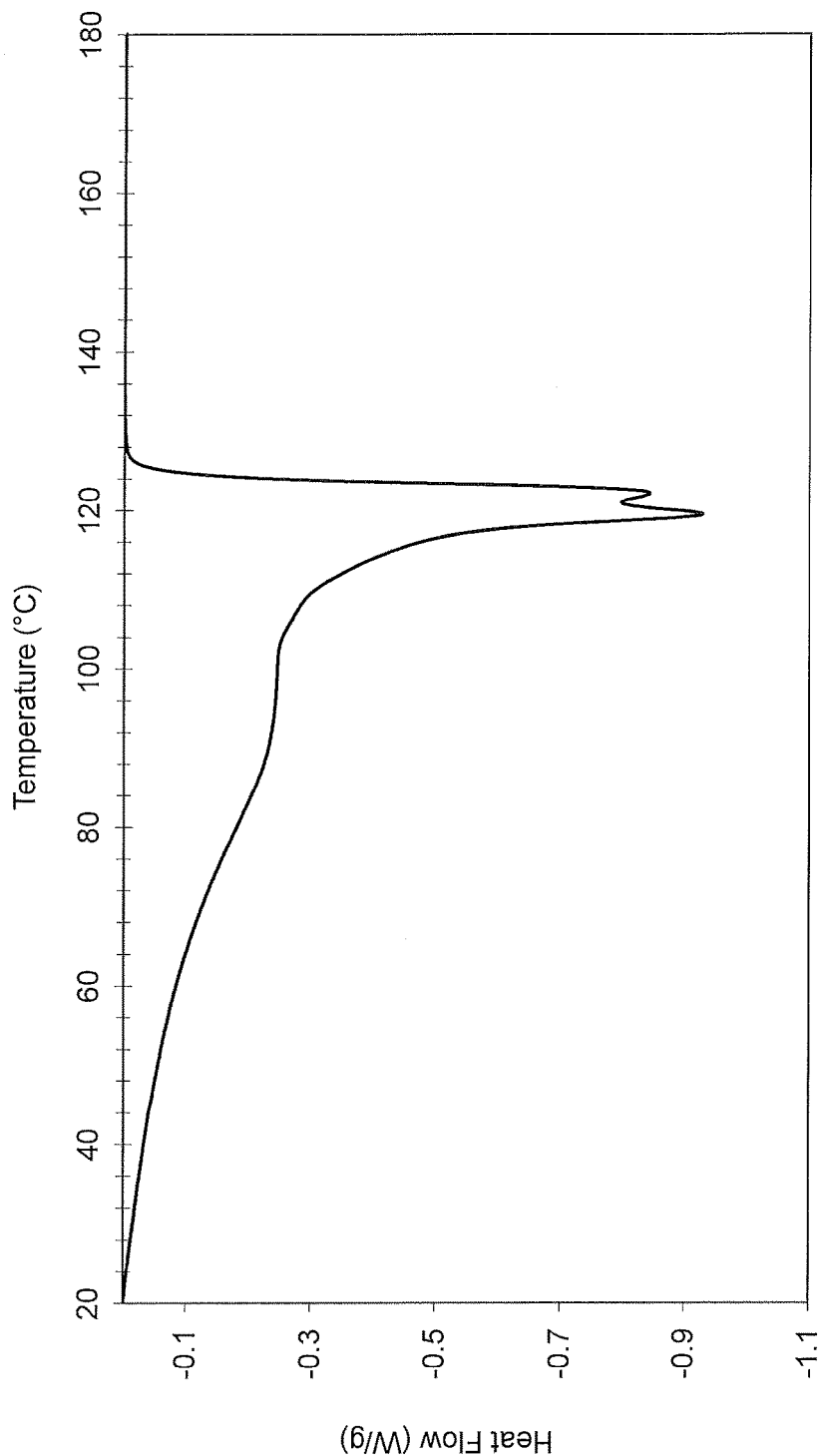
FIG. 5: DSC Profile Measurements for ELITE™ 5500G

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Other VLDPE copolymers made with a metallocene catalyst in a gas phase reactor using ethylene and hexene comonomer are known and are, for example, those commercialized as Exceed™ 1015, Exceed™ 1012, and the like, by ExxonMobil Chemical Company. Although some metallocene catalyzed VLDPE resins produced in a gas phase process may provide high film toughness (Dart Impact Strength>450 g/mil for a 1 mil monolayer film), they may also, due to their narrow molecular weight distributions ($M_z/M_w$<2), tend to split in the machine direction. An analysis of some metallocene catalyzed VLDPE resins produced in a gas phase process also reveals non-homogeneous melting of the VLDPE copolymer, i.e. exhibiting at least two peaks in the DSC measurement.

It is, therefore, desirable to produce a single site catalyzed VLDPE resin having high film toughness properties and which is relatively easy to process or convert into finished product. Furthermore, it is also desired to produce a VLDPE copolymer that has uniform melting behavior, i.e. exhibiting a single peak in a DSC measurement. The uniform melting behavior of the VLDPE resin is considered to be helpful in improving its hot tack and sealability characteristics especially in packaging applications such as vertical form fill seal (VFFS) and horizontal form fill seal (HFFS). One example of a polymer that provides excellent sealing characteristics in VFFS and HFFS applications is Surlyn® (commercially available from DuPont) that exhibits a uniform melting behavior with a single melting peak in the DSC measurement. However, Surlyn® is an expensive ionomer resin, and there is a desire to achieve good sealability characteristics from a lower cost VLDPE copolymer.

It has now been found that a new VLDPE polymer composition with good processability and toughness characteristics can be produced with the single site catalysts under certain reactor conditions.

In one embodiment, provided is an ethylene copolymer having a density from about 0.890 to about 0.915 g/cm³, a molecular weight distribution $M_w/M_n$ of from about 2.2 to about 4.5, a molecular weight distribution $M_z/M_w$ of greater than 2, provided that when the $M_z/M_w$ is greater than 3, the copolymer further has a normal to flat comonomer distribution, a $CDBI_{50}$ from about 55 to about 98; and a single peak in a DSC measurement.

In another embodiment, provided is an ethylene copolymer having a density from about 0.890 to about 0.915 g/cm³, a molecular weight distribution $M_w/M_n$ of from about 2.2 to about 4.5, a molecular weight distribution $M_z/M_w$ of from about 2 and to about 3, a $CDBI_{50}$ from about 55 to about 98, and a single peak in a DSC measurement.

In another embodiment, provided is an ethylene copolymer having a density from about 0.890 to about 0.915 g/cm³, a molecular weight distribution $M_w/M_n$ of from about 2.2 to about 4.5, a molecular weight distribution $M_z/M_w$ of greater than 3, a $CDBI_{50}$ from about 55 to about 98, and a normal to flat comonomer distribution, and a single peak in a DSC measurement.

In some embodiments, the Melt Index, $I_2$ of the ethylene copolymer, or polymer composition made therefrom, is from about 0.25 to about 20 g/10 min, or from about 0.25 to about 10 g/10 min, or from about 10 to about 20 g/10 min, or from about 0.4 to about 10 g/10 min, or from about 0.4 to about 5 g/10 min, or from about 0.4 to about 2 g/10 min.

In some embodiments, the $M_w/M_n$ of the ethylene copolymer, or polymer composition made therefrom, is from about 2.2 to about 4.5, or from about 2.6 to about 4.5, or from about 3.5 to about 4.3, or from about 2.6 to about 4.3, or from about 2.2 to about 4.0.

In some embodiments, the $M_z/M_w$ of the ethylene copolymer, or polymer composition made therefrom, is from about 2.0 and to about 2.5, or is from about 2.5 and to about 2.8, or is from about 2.5 and to about 3, or is from about 2.1 and to about 2.8. In some embodiments, when the $M_z/M_w$ of the ethylene copolymer, or polymer composition made therefrom, is from about 2 to about 3, the ethylene copolymer or composition exhibits a reverse comonomer distribution, or it exhibits a normal comonomer distribution, or it exhibits a flat comonomer distribution.

In other embodiments, the $M_z/M_w$ of the ethylene copolymer, or polymer composition made therefrom, is from 3 to about 6, or from 3 to about 5, or from 3 to about 4, or from 3 to about 3.5, and has a comonomer distribution of the ethylene copolymer, or polymer composition made therefrom, that is normal to flat.

In some embodiments, the ethylene copolymers described herein have a G' at G"$_{(500\ Pa)}$ at 190° C. of less than 40 Pa; or for example, of less than 35 Pa; or for example, of less than 30 Pa. In some embodiments, the ethylene copolymers described herein have a G' at G"$_{(500\ Pa)}$ at 190° C. from about 20 Pa to about 40 Pa, or from about 20 Pa to about 35 Pa.

Ethylene copolymers may have a unimodal, broad unimodal, bimodal, or multimodal profile in a gel permeation chromatography (GPC) curve generated according to the method of ASTM D6474-99.

As used herein, "unimodal" means that there is not more than one distinguishable peak in the GPC curve measured according to the method of ASTM D6474-99. Unimodal includes a peak in the GPC curve, where there is one peak. Unimodal also includes GPC traces containing shoulders, or buried peaks, that cannot be easily separated, or deconvoluted into well-defined unique peaks. Bimodal GPC traces comprise curves when there is a local extremum between peaks, and the peaks can be separated or deconvoluted. Alternatively, the term "bimodal" connotes the presence of two maxima (which may be equal, or may have one local and one global maximum) in a molecular weight distribution curve generated according to the method of ASTM D6474-99. The term "multi-modal" denotes the presence of two or more maxima (again, these maxima likely have a single global maximum, but there could be more than one equal peak) in a molecular weight distribution curve generated according to the method of ASTM D6474-99.

In an embodiment of the invention, the ethylene copolymer will have a unimodal profile in a gel permeation chromatography (GPC) curve generated according to the method of ASTM D6474-99.

In an embodiment of the invention, the ethylene copolymer will have a unimodal profile with a shoulder or buried peak in a gel permeation chromatography (GPC) curve generated according to the method of ASTM D6474-99.

In an embodiment of the invention, the ethylene copolymer will have a bimodal profile in a gel permeation chromatography (GPC) curve generated according to the method of ASTM D6474-99.

In an embodiment of the invention, the ethylene copolymer will have a multimodal profile in a gel permeation chromatography (GPC) curve generated according to the method of ASTM D6474-99.

The number of short chain branches per 1000 carbon atoms, is measured relative to the copolymer fractions of different molecular weights. When plotted on a semi-logarithmic scale graph, the sloping line (from low molecular weight fractions to high molecular weight fractions on the logarithmic horizontal x-axis and the number of short chain branches on the vertical y-axis) is the short chain branching distribution determined by Fourier Transform Infra-Red (FTIR) spectrometry for the different molecular weight fractions. For an upwardly sloping line, the number of short chain branches increases with an increase of the molecular weight, and hence the comonomer incorporation is said to be "reversed". For a downwardly sloping line, the number of short chain branches decreases with an increase of the molecular weight, and hence the comonomer incorporation is said to be "normal". For a flat line, the number of short chain branches remains relatively constant with an increase of the molecular weight, and hence the comonomer incorporation is said to be "flat". It can be difficult to determine the short chain branching distribution accurately by FTIR at lower molecular weights than $M_n$ and at higher molecular weights than $M_w$ due to low concentration of polymer chains in the solution. In this disclosure, flat comonomer distribution means that the number of short chain branches per 1000 carbon atoms determined at $M_n$ and at $M_w$ are within 5% of one another.

The phrase "reverse comonomer incorporation" also means that on deconvolution of the GPC-FTIR, or Temperature Rising Elution Fractionation (TREF) data profiles, using molecular weight distribution segments of not less than 10,000 Da, there is one or more higher molecular weight component having a higher comonomer incorporation than the comonomer incorporation in one or more lower molecular weight segments.

In some embodiments, the ethylene copolymers and/or the polymer compositions made therefrom have a $CDBI_{50}$ of from about 55 to about 98, from about 75 to about 98, or from about 65 to about 95, or from about 70 to about 85. In other embodiments the $CDBI_{50}$ is from about 55 to about 70, or from about 70 to about 98. In other embodiments the $CDBI_{50}$ is greater than 75.

In some embodiments, the polymers disclosed herein have a single peak in the DSC measurement when measured using ASTM D3418-12. The method includes heating, annealing, cooling and reheating to remove residual stresses in the sample. As used herein, "a single peak" means that there is not more than one distinguishable peak in the DSC profile (as determined using DSC measurement at a ramp rate of 10° C./min). A single peak includes a peak in the DSC curve, where there is one peak. The single peak also includes DSC melting curves containing shoulders that cannot be easily separated, or deconvoluted into well-defined peaks. FIGS. 1, 2, 3, and 5 demonstrate more than one peak in the DSC profiles. In these figures, there is one or more local extremum between the peaks, and the peaks can be separated or deconvoluted. Often, a DSC profile with more than one peak is characterized as having an identifiable low melting component and an identifiable high melting component. In contrast, FIGS. 6, 7 and 8 and FIG. 4 demonstrate single peaks in the DSC profiles. These examples also include a single peak with one or more shoulders that cannot be easily separated or deconvoluted into peaks via well-defined local extremum.

In one embodiment, provided is an ethylene copolymer made from ethylene and one or more $C_{3-12}$ alpha olefin comonomers, or one or more $C_{4-10}$ alpha olefin comonomers, in a polymerization process using at least one single site catalyst.

In one embodiment, the single-site catalyst is selected from catalysts of the formula:

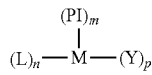

wherein M is a group 4 metal;
PI is a phosphinimine ligand;
L is a monoanionic ligand selected from the group consisting of a cyclopentadienyl-type ligand;

Y is an activatable ligand;
m is 1 or 2;
n is 0 or 1; and
p is an integer and the sum of m+n+p equals the valence state of M.

In some embodiments, the ethylene copolymers are prepared in the presence of a phosphinimine catalyst of the formula:

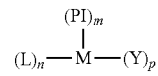

wherein M is a group 4 metal, for example a metal selected from the group Ti, Zr, and Hf, (in one embodiment, M is Ti); PI is a phosphinimine ligand; L is a monoanionic ligand selected from the group consisting of a cyclopentadienyl-type ligand; Y is an activatable ligand; m is 1 or 2; n is 0 or 1; and p is an integer and the sum of m+n+p equals the valence state of M.

The phosphinimine ligand has the formula $((R^{21})_3 P=N)-$ wherein each $R^{21}$ is independently selected $C_{3-6}$ alkyl radicals. For example, $R^{21}$ is a t-butyl radical.

L is a 5-membered carbon ring having delocalized bonding within the ring and bound to the metal atom through $\eta^5$ bonds and said ligand being unsubstituted or up to fully substituted with one or more substituents selected from $C_{1-10}$ hydrocarbyl radicals which hydrocarbyl substituents are unsubstituted or further substituted by one or more substituents selected from a halogen atom and a $C_{1-8}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $-Si-(R)_3$ wherein each R is independently selected from hydrogen, a $C_{1-8}$ alkyl or alkoxy radical, and $C_{6-10}$ aryl or aryloxy radicals; and germanyl radicals of the formula $Ge-(R)_3$ wherein R is as defined above. For example, the cyclopentadienyl type ligand is selected from a cyclopentadienyl radical, an indenyl radical and a fluorenyl radical.

Y is selected from a hydrogen atom; a halogen atom, a $C_{1-10}$ hydrocarbyl radical; a $C_{1-10}$ alkoxy radical; a $C_{5-10}$ aryl oxide radical; each of which said hydrocarbyl, alkoxy, and aryl oxide radicals may be unsubstituted or further substituted by one or more substituents selected from a halogen atom; a $C_{1-8}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. For example, Y is selected from a hydrogen atom, a chlorine atom and a $C_{1-4}$ alkyl radical.

In some embodiments, the catalysts used to make the polymers may be activated with a co-catalyst selected from:

an aluminoxane compound of the formula $R^{12}_2AlO(R^{12}AlO)_mAlR^{12}_2$ wherein each $R^{12}$ is independently selected from $C_{1-20}$ hydrocarbyl radicals and m is from 3 to 50, and optionally a hindered phenol to provide a molar ratio of Al:hindered phenol from 2:1 to 5:1 if the hindered phenol is present;

an ionic activator that may be selected from:

compounds of the formula $[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from phenyl radicals which are unsubstituted or substituted with 3 to 5 substituents selected from a fluorine atom; a $C_{1-4}$ alkyl radical which is unsubstituted or substituted by a fluorine atom; a $C_{1-4}$ alkoxy radical which is unsubstituted or substituted by a fluorine atom; and a silyl radical of the formula —Si—$(R^{15})_3$; wherein each $R^{15}$ is independently selected from a hydrogen atom and a $C_{1-4}$ alkyl radical; and compounds of the formula $[(R^{18})_t\ ZH]^+[B(R^{14})_4]^-$ wherein B is a boron atom, H is a hydrogen atom, Z is a nitrogen atom or phosphorus atom, t is 2 or 3 and $R^{18}$ is selected from $C_{1-8}$ alkyl radicals, a phenyl radical which is unsubstituted or substituted by up to three $C_{1-4}$ alkyl radicals; or one $R^{18}$ taken together with the nitrogen atom may form an anilinium radical and $R^{14}$ is as defined above; and compounds of the formula $B(R^{14})_3$ wherein $R^{14}$ is as defined above; and mixtures thereof.

An aluminoxane (co-catalyst) and the ionic activator (co-catalyst) may be used separately (e.g. MAO in the first or second reactor and ionic activator in the second or first reactor, or MAO in both reactors or ionic activator in both reactors) or together (e.g. a mixed co-catalyst: MAO and ionic activators in the same reactor (i.e. the first and second reactor)). In one embodiment in the first reactor (e.g. the cold reactor) the co-catalyst could comprise predominantly (e.g. >50 weight % of the co-catalyst) of an aluminoxane co-catalyst. The co-catalyst in the cold reactor may also comprise a lesser amount (e.g. <50 weight % of the co-catalyst) of an ionic activator as described above. In this embodiment in the second reactor (e.g. the hot reactor) the activator may comprise a predominant (e.g. >50 weight % of the co-catalyst) amount of an ionic activator. The co-catalyst in the hot reactor may also comprise a lesser amount (e.g. <50 weight % of the co-catalyst) an aluminum based co-catalyst (activator) noted above. In second embodiment the co-catalysts could be the reverse of the above (e.g. predominantly ionic activator in the first reactor and predominantly aluminum based co-catalyst in the second reactor). In another embodiment the co-catalyst could comprise predominantly an aluminoxane co-catalyst in both reactors (e.g. the first and the second reactor). The co-catalyst in the both reactors may also comprise a lesser amount (e.g. <50 weight % of the co-catalyst) of an ionic activator as described above.

In one embodiment, provided is an ethylene copolymer made from ethylene and one or more $C_{3-12}$ alpha olefin comonomers in a continuous polymerization process. In another embodiment, the ethylene copolymer is made from ethylene and one or more $C_{4-10}$ alpha olefin comonomers in a continuous polymerization process. In some embodiments, the continuous solution polymerization process comprises at least two polymerization reactors.

In some embodiments, the continuous solution polymerization process comprises a first stirred tank polymerization reactor having a mean reactor temperature of from about 100° C. to about 140° C., and, a second stirred tank reactor having a mean temperature of at least about 20° C. greater than the mean reactor temperature of the first reactor.

In some embodiments, the first stirred tank polymerization reactor has a mean reactor temperature of from about 120° C. to about 138° C., or the first stirred tank polymerization reactor has a mean reactor temperature of from about 130° C. to about 137° C.

In some embodiments at least one of the reactors contains a single-site catalyst.

In some embodiments the single-site catalyst is present in the first stirred tank.

Solution processes for the (co)polymerization of ethylene are well known in the art. These processes are conducted in the presence of an inert hydrocarbon solvent, for example, a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha and mixtures thereof. An example of a suitable solvent which is commercially available is "Isopar E" ($C_{5-12}$ aliphatic solvent, ExxonMobil Chemical Company).

The solution polymerization processes may use two or more polymerization reactors. The first polymerization reactor may operate at a lower temperature ("cold reactor") using a "phosphinimine catalyst" described in above. In an embodiment, the polymerization temperature in the first reactor is from about 80° C. to about 140° C. and the hot reactor is operated, for example, at a higher temperature (up to about 220° C.). In another embodiment, the reaction process is a "medium pressure process", meaning that the pressure in each reactor may be up to about 6,000 psi (about 42,000 kilopascals or kPa), or from about 2,000 psi to about 3,000 psi (about 14,000 to about 22,000 kPa). In other embodiments, the pressure may be about 725 psi to about 3,000 psi (about 5,000 kPa to 22,000 kPa).

Suitable monomers for copolymerization with ethylene include $C_{3-20}$ mono- and diolefins. Example comonomers include $C_{3-12}$ alpha olefins which are unsubstituted or substituted by up to two $C_{1-6}$ alkyl radicals, $C_{5-12}$ vinyl aromatic monomers which are unsubstituted or substituted by up to two substituents selected from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes, and the like, (e.g. 5-methylene-2-norbornene and 5-ethylidene-2-norbornene, bicycle-(2,2,1)-hepta-2,5-diene).

In one embodiment, the polyethylene polymers are VLDPE's which may comprise not less than about 60, or not less than about 75 weight % of ethylene and the balance of one or more $C_{4-10}$ alpha olefins. In some embodiments the $C_{4-10}$ alpha olefins are selected from 1-butene, 1-hexene and 1-octene. In another embodiment, the $C_{4-10}$ alpha olefin may be present in an amount from about 8 to about 30 weight %, or from about 10 to about 25 weight %.

In some embodiments the copolymer or polymer compositions described herein may be, co- and ter-polymers of ethylene, $C_{3-10}$ alpha olefins, and optionally one or more diene monomers. Generally, such polymers will contain from about 50 to about 85 weight % ethylene, or from about 50 to about 75 weight % ethylene and correspondingly from 50 to 15 weight % or 50 to 25 weight % of a mixture of comonomers from $C_{3-10}$ alpha olefins or dienes. Illustrative non-limiting examples of such dienes are one or more of dicyclopentadiene, 5-methylene-2-norbornene, 5-ethylidene-2-norbornene, 5-vinyl-2-norbornene, and 1,4-hexadiene.

The monomers may be dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen, oxygenates or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) may be treated in a similar manner.

The feedstock may be heated or cooled prior to feeding to the first reactor. Additional monomers and solvent, which may optionally be heated or cooled, may be added to the second reactor.

The catalyst components may be premixed in the solvent for the reaction or fed as separate streams to each reactor. In some instances premixing may be desirable to provide a reaction time for the catalyst components prior to entering the reaction. Such an "in line mixing" technique is known in the art.

The residence time in each reactor will depend on the design and the capacity of the reactor. The reactors may be operated under conditions to achieve a thorough mixing of the reactants. In some embodiments the reaction can be carried out using two reactors in series or in parallel. From about 20 to about 60 weight % of the final polymer is polymerized in the first reactor, with the balance being polymerized in the second reactor. On leaving the reactor system the non-reactive components may be removed and the resulting polymer may be finished in a conventional manner.

In some embodiments, the first polymerization reactor has a smaller volume than the second polymerization reactor. In some embodiments, the VLDPE polymers produced under these conditions have a combination of desirable properties. For example, the ethylene-octene type VLDPE polymers illustrated in the following examples have excellent dart impact strength and puncture resistance, (which are typically associated with VLDPE prepared using metallocene catalysts) and exhibit good processability (often associated with VLDPE produced using conventional Ziegler Natta catalysts). In addition, the VLDPE polymers illustrated in the following examples have homogeneous melting behaviors exhibiting a single melting peak in the DSC profiles. In some embodiments that display this combination of desirable properties in the final VLDPE polymers, the first reactor in the solution process was operated below 140° C. Table 1 provides the reaction conditions including reactor 1 average temperatures for the three inventive copolymer examples.

Also provided are polymer compositions comprising the copolymers described herein above. The polymer compositions may further comprise additives, colorants, anti-aging agents, antioxidants, polymer process aids and the like commonly known in the art. In some embodiments, thermoplastic additives may also be used. These additives can be added during the polymerization process or during the extrusion process used to create the polymer resin. In other embodiments, additives can be introduced using a dry blend or during a hot blend or melt extrusion process commonly known in the art.

Also provided are polymer compositions comprising a mixture of the copolymers described herein blended with another low density polyethylene (LDPE), a high density polyethylene (HDPE), a linear low density polyethylene (LLDPE) or a very low density polyethylene (VLDPE) or an ultra low density polyethylene (ULDPE). Those skilled in the art would recognize the type of blend that is needed depends on the specific application or product for which the blend will be used. When used in such blended compositions, the copolymers described herein may comprise from about 0.1% to about 99% by weight of the polymer composition, or from about 1% to about 99%, or from about 1% to about 50%, or from about 1% to about 25%, or from about 10% to about 90%, or from about 15% to about 95%, or from about 50% to about 99% or from about 75% to about 95%. The remainder of these compositions comprises one or more additional polymers, for example, poly α-olefins such as polyethylene or polypropylene, and optionally additives as described herein above.

Also provided are films comprising the copolymer or polymer compositions described herein. In one embodiment, the film is a monolayer film. In another embodiment the film is a multilayer film.

The extrusion-blown film process is a well-known process for the preparation of plastic film. The process employs an extruder which heats, melts and conveys the molten plastic and forces it through an annular die. Extrusion temperatures may range from about 330° F. (165° C.) to about 500° F. (260° C.), or from about 350° F. (175° C.) to about 460° F. (240° C.).

The film comprising polyethylene copolymer is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the transverse direction, by the use of forced air which "blows out" the diameter of the bubble, and in the lengthwise direction (or the machine direction) of the bubble by the action of a winding element which pulls the bubble through the machinery. External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation in both the machine direction and the transverse or cross direction.

A balance of machine direction ("MD") and transverse direction ("TD"—which is perpendicular to MD) molecular orientation is generally considered desirable for the films associated with some embodiments of the invention. For example, Dart Impact strength, Machine Direction and Transverse Direction tear properties may be affected.

Thus, it is recognized that these stretching forces on the bubble can affect the physical properties of the finished film. In particular, it is known that the blow up ratio (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a co-extrusion process that allows more than one stream of molten polymer to be introduced to an annular die resulting in a multi-layered film membrane or 2) a lamination process in which film layers are laminated together.

In some embodiments of the invention, the films are prepared using the above described blown film process.

An alternative process is the so-called cast film process, wherein the ethylene copolymer or polymer compositions made therefrom, is melted in an extruder, then forced through a linear slit die, thereby "casting" a thin flat film. The extrusion temperature for cast film may be somewhat hotter than that used in the blown film process, with operating temperatures ranging from about 400° F. (205° C.) to about 550° F. (290° C.). The cast film may be cooled (or quenched) more rapidly than blown film.

The above description relates to the preparation of monolayer cast films. Multilayer films may be prepared by 1) a co-extrusion process that allows more than one stream of molten polymer to be introduced to a linear slit die resulting in a multi-layered film membrane or 2) a lamination process in which film layers are laminated together.

In some embodiments, the films are prepared using a cast film process. In other embodiments, the films are prepared using the blown film processes. In some embodiments the films are prepared using a double bubble film blowing process. In some embodiments the films are prepared using a biaxial stretch film process. In some embodiments the films are prepared using a shrink film process. In some embodiments the multi-layer films are prepared wherein the film structure contains one or more layer comprising one or more of the VLDPE compositions described above.

Also provided are packaging articles such as bags, pouches, cartons, bins, containers, and the like, comprising the copolymer or polymer compositions described herein. In some embodiments the packaging articles include multilayer films comprising the copolymers described herein as the sealant layer and/or a toughness enhancing layer. In some embodiments, when the copolymers are used in the skin layer, they provide good hot tack and sealability characteristics as well as improved film toughness. In some embodiments, when the copolymers are used in any of the core layers of a multilayer film, they provide improved film toughness and puncture resistance.

In some embodiments, the packaging articles are multilayer films comprising the copolymers or polymer compositions described herein as a component of a tie layer concentrate.

In some embodiments, the packaging articles include multilayer films or sheets comprising the copolymers or polymer compositions described herein for use in thermoformed packages for use in different packaging applications such as food packaging applications.

In some embodiments, the packaging articles include multilayer films or sheets comprising the copolymers or polymer compositions described herein for use in biaxial shrink packaging for use in different packaging applications including collation shrink.

In some embodiments, the copolymers or polymer compositions described herein blended with other ethylene polymers and copolymers such as LDPE, HDPE, LLDPE and the like may be used in one or more layers of the multilayer films or sheets.

The present invention will further be described by reference to the following examples. The following examples are merely illustrative of the invention and are not intended to be limiting. Unless otherwise indicated, all percentages are by weight.

The novel characteristics of the inventive very low density polyethylene (VLDPE) copolymers will now be demonstrated through the following non-limiting examples.

Examples

VLDPE copolymer compositions were produced with a single site catalyst in a dual reactor solution process using ethylene monomer and octene as a comonomer. Polymer and film properties were measured using test methods described below.

Polymer density was determined in grams per cubic centimeter (g/cm$^3$) according to ASTM D792.

Melt index (MI), $I_2$, in g/10 min was determined on a Tinius Olsen Plastomer (Model MP993) in accordance with ASTM D1238 Procedure A (Manual Operation) at 190° C. with a 2.16 kilogram weight. Melt index, $I_{10}$, in g/10 min was determined in accordance with ASTM D1238 Procedure A at 190° C. with a 10 kilogram weight. Melt index, $I_6$, in g/10 min was determined in accordance with ASTM D1238 Procedure A at 190° C. with a 6.48 kilogram weight. High load melt index, $I_{21}$, in g/10 min was determined in accordance with ASTM D1238 Procedure A at 190° C. with a 21.6 kilogram weight. Melt flow ratio (MFR, also sometimes called melt index ratio) is $I_{21}/I_2$. Stress Exponent (S.Ex.) is $\log(I_6/I_2)/\log(6480/2160)$.

The melting behavior including a peak melting point ($T_m$), the number of peaks and the percent crystallinity of the copolymers are determined by using a TA Instrument DSC Q1000 Thermal Analyzer at a rate of 10° C./min compliant with ASTM D3418-12. In a DSC measurement, a heating-cooling-heating cycle from room temperature to 200° C. is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

The average molecular weights and the molecular weight distributions were determined using a Waters Model 150 Gel Permeation Chromatography (GPC) apparatus equipped with a differential refractive index detector. The co-monomer distribution of the resins was determined through GPC-FTIR.

$M_n$ is the number average molecular weight, $M_w$ is the weight average molecular weight and $M_z$ is the z-average molecular weight. The ratio of $M_w/M_n$ is a measure of the breadth of the molecular weight distribution of the polymer and this ratio is referred to as the polydispersity index. The ratio of $M_z/M_w$ is a measure of the breadth of the high molecular weight fraction of the polymer molecular weight distribution. The formulas to calculate $M_n$, $M_w$, and $M_z$ are provided in ASTM 6474-99.

The determination of branch frequency as a function of molecular weight (and hence the comonomer distribution) was carried out using high temperature Gel Permeation Chromatography (GPC) and FTIR of the eluent. Polyethylene standards with a known branch content, polystyrene and hydrocarbons with a known molecular weight were used for calibration.

To determine Composition Distribution Breadth Index, $CDBI_{50}$, a solubility distribution curve is first generated for the polyethylene composition. This is accomplished using data acquired from the Temperature Rising Elution Fractionation (TREF) technique. This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median.

The specific TREF method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (at the rate of 0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

Dynamic Mechanical Analysis (DMA) rheological measurements (e.g. small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity (η*). The values of storage modulus G' were estimated at a constant value of loss modulus G" at 500 Pa at 190° C. (G' at $G"_{(500\ Pa)}$). This is to characterize and discriminate the viscoelastic properties of the comparative and inventive copolymers. This test technique provides an opportunity to study the various characteristics of a polymer melt where the elastic and viscous modulus (G' and G"), viscosity (η*), and tan δ as a function of dynamic oscillation (frequency) are generated to provide information on the rheological behavior in correlation with the molecular architecture.

A variety of tests can be used to measure film quality. Some examples follow.

ASTM Standard # F1921-98 was used for Hot Tack measurements on Lako Tool's SL-10 Hot Tack Tester. To determine hot tack strength, one-inch (25.4 mm) wide strips of film were mounted on a Lako Tool's SL-10 Hot Tack Tester at seal time of 0.5 s, cool time of 0.5 s, peel speed of 33.0 mm/s and seal pressure of 0.687 N/mm². Five specimens were tested at each temperature and average results are reported. Hot tack strength is recorded in Newtons (N)/inch width.

ASTM F88-09A was used to measure the Heat Seal Strength. A seal was prepared by clamping two 2 mil thick film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrument 5-Head Universal Tester (Model TTC-102). In this test, two films are sealed over a range of temperatures. Seals were then aged at least 24 hours at 73° F. (23° C.) and then subjected to tensile testing. The following parameters were used in the Heat Seal Strength Test: film specimen width, 1 inch (25.4 mm); film sealing time, 0.5 second; film sealing pressure, 0.27 N/mm²; temperature range, 176° F. to 302° F. (80° C. to 150° C.) and temperature increment, 9° F. (5° C.). After aging, seal strength was determined using the following tensile parameters: pull (crosshead) speed, 12 inch/minute (30.5 cm/minute); direction of pull, 90° to seal; full scale load, 11 lb (5 kg); and 5 samples of film were tested at each temperature increment. The Seal Initiation Temperature (SIT) is the minimum temperature at which the heat seal strength (force per 12.7 mm of film sample) exceeds 4.4 N.

Dart impact strength was measured on a dart impact tester (Model D2085AB/P) made by Kayeness Inc. in accordance with ASTM D-1709-04 (Method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT (HIGH)-500N-192) in accordance with ASTM D-5748.

Comparative and Inventive Copolymers

Exceed™ 1015HA, Exceed™ 1012HA, and Exact™ 3132 are commercially available from ExxonMobil Chemical Company. ELITE™ 5500G, AFFINITY™ PL1840G, AFFINITY™ PL1880G, ENGAGE™ 8450, ATTANE™ 4201G and ATTANE™ 4203 are commercially available from The Dow Chemical Company; MarFlex® D163 is commercially available from Chevron Phillips Chemical Company; Evolue® SP2020 is commercially available from Prime Polymer Co., Ltd.; MXSTEN® CV77516 is commercially available from Westlake Chemical Corporation. Comparative Example, SCLAIR® FP112-A is commercially available from NOVA Chemicals Corporation.

Example polymers were prepared using a single site catalyst in a dual reactor solution process and the conditions and reagents are outlined in Table 1.

TABLE 1

Pilot Plant Process Conditions
Table of Pilot Plant Process Conditions

| SAMPLE ID | EX1 | EX2 | EX3 |
|---|---|---|---|
| Total solution rate (kg/h) | 577.2 | 553.0 | 553.0 |
| Solution rate reactor 1 (kg/h) | 385.7 | 335.3 | 326.9 |
| Solution rate reactor 2 (kg/h) | 191.5 | 214.6 | 223.1 |
| Ethylene concentration in Reactor 1 (%) | 9.4 | 8.6 | 9.0 |
| Ethylene concentration Overall (%) | 12.6 | 10.5 | 10.7 |
| Ethylene Flow Percent Split: (Reactor 1/(Reactor 1 + Reactor 2)) *100% (%) | 50.0 | 50.0 | 50.0 |
| Comonomer Flow Split Ratio: (Reactor 1/(Reactor 1 + Reactor 2)) | 1.0 | 1.0 | 1.0 |
| Comonomer/Ethylene ratio (wt./wt.) | 0.94 | 1.24 | 1.20 |
| Reactor 1 inlet temperature (° C.) | 35.0 | 30.0 | 30.0 |
| Reactor 2 inlet temperature (° C.) | 35.0 | 30.0 | 30.0 |
| Reactor 1 average temperature (° C.) | 134.9 | 126.5 | 130.6 |
| Reactor 2 average temperature (° C.) | 187.8 | 166.0 | 170.4 |
| Ethylene conversion reactor 1 (%) | 78.5 | 80.0 | 80.0 |
| Ethylene conversion reactor 2 (%) | 89.2 | 83.0 | 85.0 |

TABLE 1-continued

Pilot Plant Process Conditions
Table of Pilot Plant Process Conditions

| SAMPLE ID | EX1 | EX2 | EX3 |
|---|---|---|---|
| Hydrogen in Reactor 1 (ppm) | 0.61 | 0.21 | 0.73 |
| Hydrogen in Reactor 2 (ppm) | 0.80 | 0.50 | 0.50 |
| Reactor 1 CAT A (ppm) | 0.09 | 0.10 | 0.11 |
| Reactor 1 CAT B:CAT A RATIO (mol/mol) | 100 | 100 | 100 |
| Reactor 1 CAT C:CAT B RATIO (mol/mol) | 0.3 | 0.3 | 0.3 |
| Reactor 1 CAT D:CAT A RATIO (mol/mol) | 1.2 | 1.2 | 1.2 |
| Reactor 2 CAT A (ppm) | 0.20 | 0.18 | 0.26 |
| Reactor 2 CAT B:CAT A RATIO (mol/mol) | 40.0 | 25.0 | 25.0 |
| Reactor 2 CAT C:CAT B RATIO (mol/mol) | 0.3 | 0.3 | 0.3 |
| Reactor 2 CAT D:CAT A RATIO (mol/mol) | 1.3 | 1.3 | 1.3 |
| Polymer Production Rate (kg/h) | 91.6 | 67.8 | 70.6 |
| Reactor 1 Agitator speed (rpm) | 325 | 690 | 690 |
| Reactor 2 Agitator speed (rpm) | 408 | 690 | 690 |
| Antioxidant 1 (ppm) | 1022.7 | 586 | 539 |
| Antioxidant 2 (ppm) | 1020.1 | 539 | 546 |

CAT A: Catalyst component A = cyclopentadienyltitanium(tri-tert-butylphosphinimine) dichloride
CAT B: Catalyst component B = Methylalumoxane (or "MAO"), "MMAO-7" from Akzo-Nobel.
CAT C: Catalyst component C = 2,6-di-tert-butyl-4-ethyl-phenol
CAT D: Catalyst component D = tetrakis(pentafluorophenyl)borate
Antioxidant 1 = Irganox 1076 commercially available from BASF Corporation
Antioxidant 2 = Irgaphos 168 commercially available from BASF Corporation Polymer properties of comparative and inventive copolymers were measured as described above and are reported in Table 2 and Table 3, respectively. The melt index, $I_2$ and density values of the resins in Table 2 are from product datasheets of respective resin grades published by their manufacturers.

TABLE 2

Resin and Molecular Characteristics of Comparative Examples

| Resin Grade Name | AFFINITY PL1880G | ENGAGE 8450 | AFFINITY PL1840G | Exceed 1015HA | Exceed 1012HA | MarFlex D163 |
|---|---|---|---|---|---|---|
| Density (g/cc) | 0.902 | 0.902 | 0.909 | 0.915 | 0.912 | 0.914 |
| MI, $I_2$ (g/10 min) | 1.0 | 3.0 | 1.0 | 1.0 | 1.0 | 0.9 |
| MFR | 29.6 | 24.2 | 34.7 | 16.2 | 16.7 | 16.7 |
| S. Ex. | 1.41 | 1.3 | 1.48 | 1.12 | 1.13 | 1.14 |
| $M_w/M_n$ | 1.81 | 1.77 | 1.91 | 1.96 | 2.1 | 1.59 |
| $M_z/M_w$ | 1.70 | 1.55 | 1.68 | 1.68 | 1.65 | 1.52 |
| G' at $G''_{(500Pa)}$ (Pa) | 60 | 35 | 73 | 8 | 9 | 19 |
| $CDBI_{50}$ | 88.8 | 89.4 | 83.9 | 67.1 | 71.6 | 73 |
| Number of peaks in DSC | 1 | 1 | 1 | 2 | 2 | 2 |

| Resin Grade Name | Exact 3132 | ELITE 5500G | ATTANE 4201G | Evolue SP2020 | ATTANE 4203 | SCLAIR FP112-A | MXSTEN CV77516 |
|---|---|---|---|---|---|---|---|
| Density (g/cc) | 0.900 | 0.914 | 0.912 | 0.915 | 0.905 | 0.912 | 0.91 |
| MI, $I_2$ (g/10 min) | 1.2 | 1.5 | 1.0 | 2.1 | 0.8 | 0.9 | 1.0 |
| MFR | 15.7 | 25.6 | 30.3 | 24.4 | 32.8 | 30.7 | 30.8 |
| S. Ex. | 1.1 | 1.29 | 1.33 | 1.23 | 1.35 | 1.35 | 1.34 |
| $M_w/M_n$ | 2.25 | 2.62 | 3.58 | 3.01 | 3.6 | 3.64 | 3.42 |
| $M_z/M_w$ | 1.73 | 2.40 | 3.02 | 2.39 | 3.21 | 3.06 | 2.89 |
| G' at $G''_{(500Pa)}$ (Pa) | 7 | 38 | 39 | 35 | 54 | 49 | 51 |
| $CDBI_{50}$ | | 26.1 | 51 | 64.7 | 50.8 | 55.7 | 33.9 |
| Number of peaks in DSC | 1 | 2 | 3 | 3 | 3 | 3 | 1 |

TABLE 3

Resin and Molecular Characteristics of Inventive Examples

| Resin Grade Name | EX 1 | EX 2 | EX 3 |
|---|---|---|---|
| Density (g/cc) | 0.914 | 0.904 | 0.906 |
| MI, $I_2$ (g/10 min) | 0.82 | 0.44 | 1.0 |
| MFR | 33.6 | 41.9 | 42.3 |
| S. Ex. | 1.31 | 1.34 | 1.34 |
| $M_w/M_n$ | 3.66 | 3.71 | 4.19 |
| $M_z/M_w$ | 2.72 | 2.58 | 2.65 |
| G' at $G''_{(500Pa)}$ (Pa) | 26 | 31 | 23 |
| $CDBI_{50}$ | 77.1 | 83.4 | 80.6 |
| Number of peaks in DSC | 1 | 1 | 1 |

It can be seen that AFFINITY™ PL1880G, ENGAGE™ 8450, AFFINITY™ PL1840G, Exceed™ 1015HA, Exceed™ 1012HA, and MarFlex® D163 have $M_w/M_n$ below 2.2 and $M_z/M_w$ below 2. Exact™ 3132 also has an $M_z/M_w$ below 2. Whereas, the inventive examples have $M_w/M_n$ greater than 2.2 and $M_z/M_w$ greater than 2 indicating different molecular architecture in contrast to the comparative copolymers.

Figure 6:
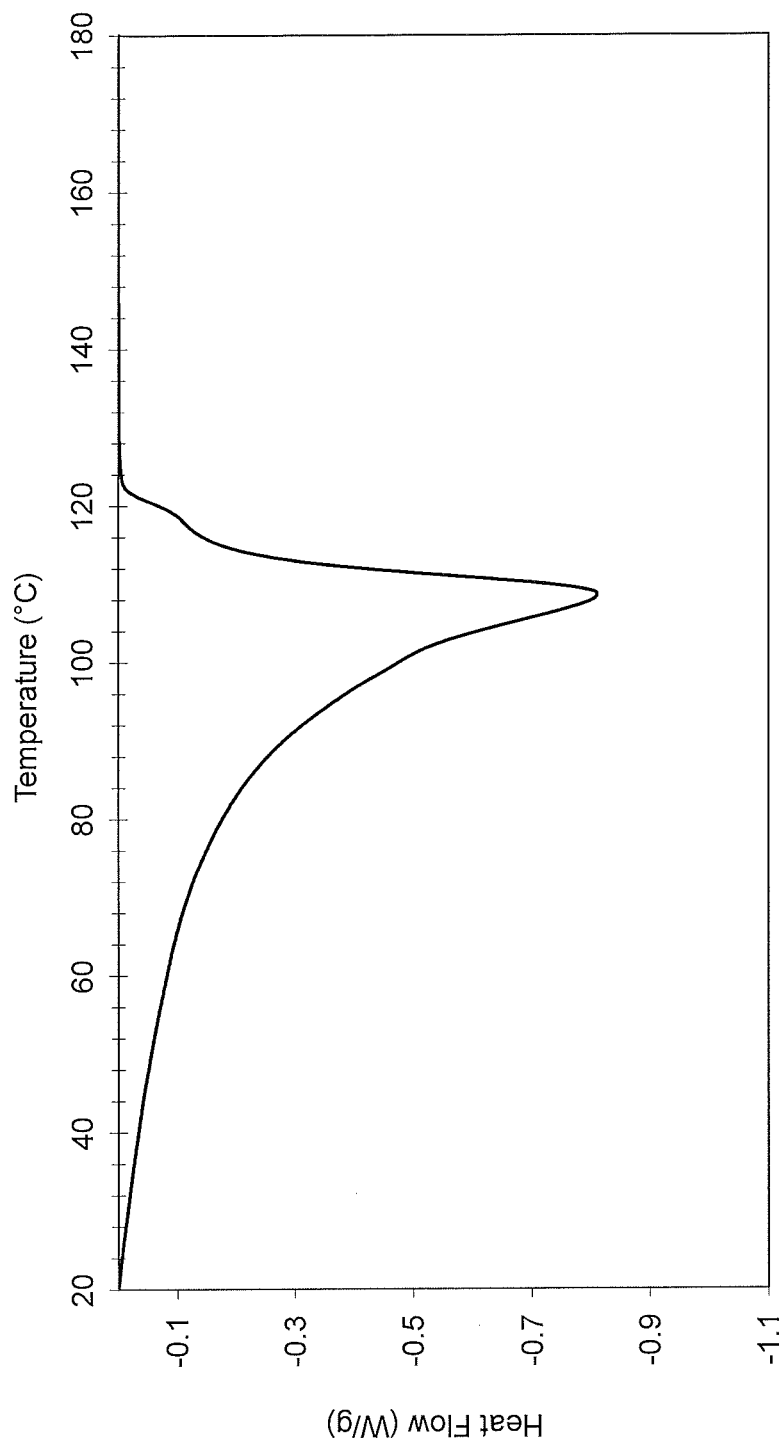
FIG. 6: DSC Profile Measurements for EX1
Figure 7:
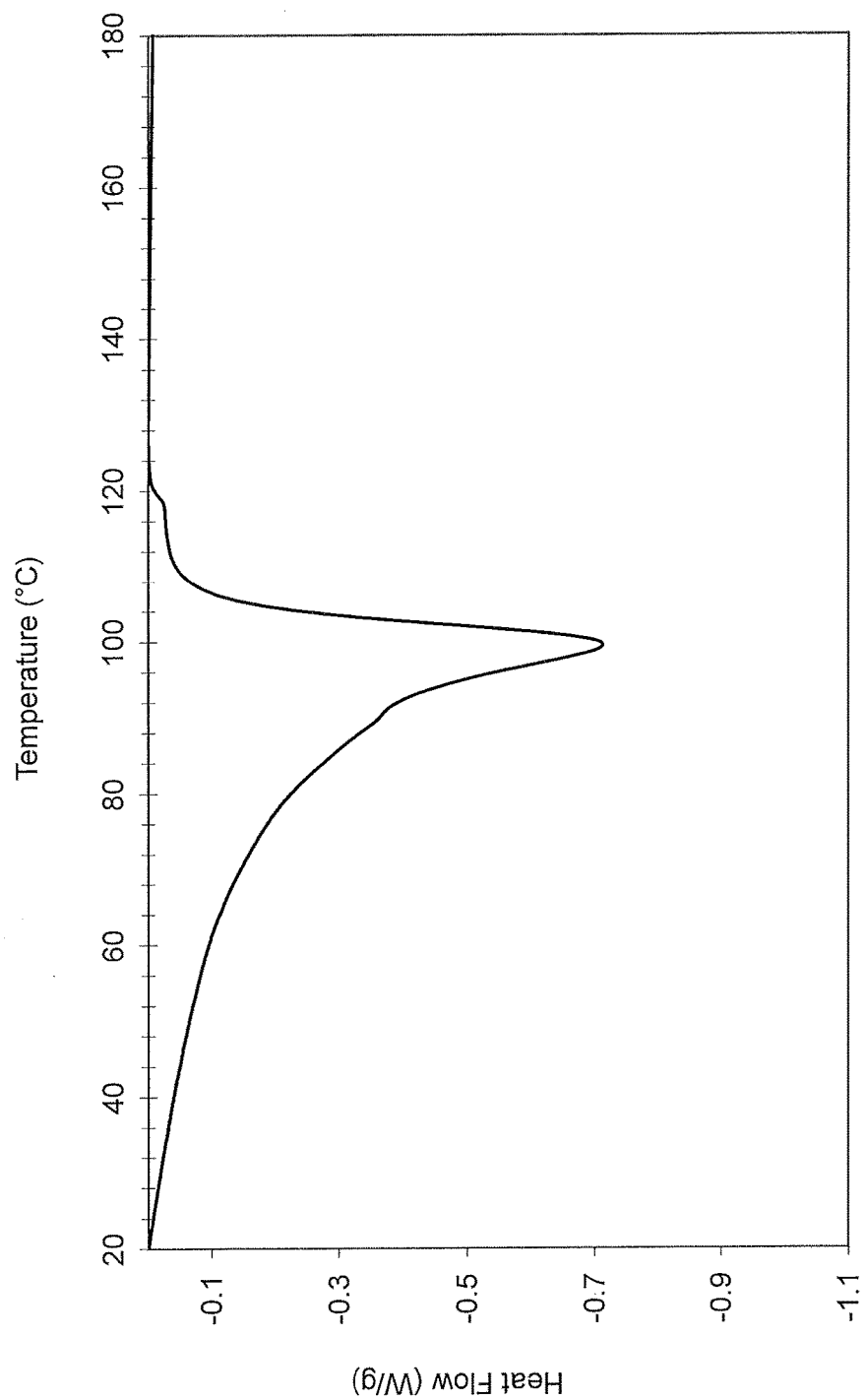
FIG. 7: DSC Profile Measurements for EX2
Figure 8:
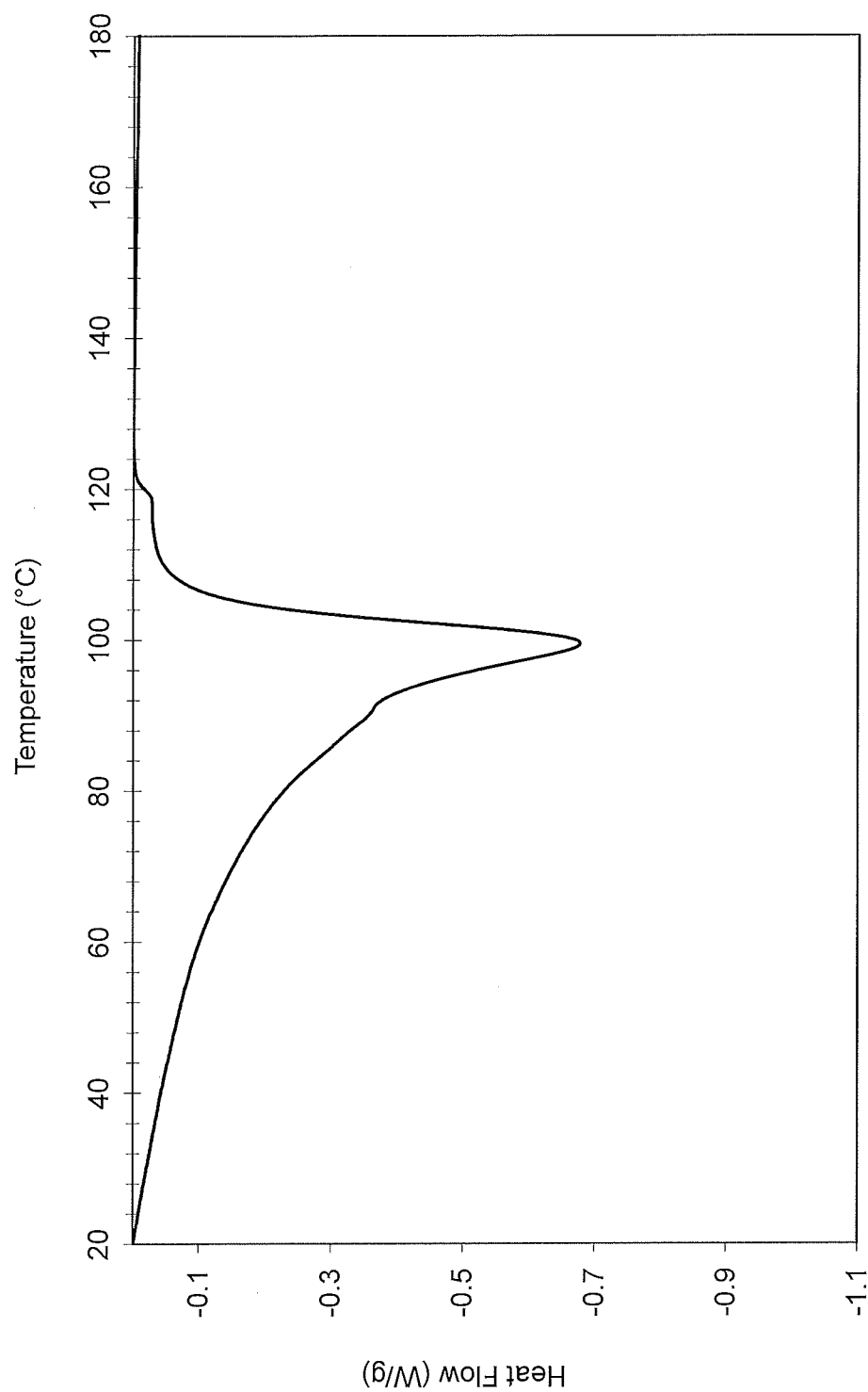
FIG. 8: DSC Profile Measurements for EX3

It is seen from the DSC profiles in FIGS. 1, 2, 3, and 5 that the comparative VLDPE compositions (Exceed™ 1015HA, SCLAIR® FP112-A, Evolue® SP2020 and ELITE™ 5500G) have more than one peak in the DSC measurement, whereas the inventive VLDPE copolymers have a single peak in the DSC measurement (FIGS. 6, 7 and 8). While the AFFINITY™, ENGAGE™ and Exact™ comparative resins, have a single DSC peak, their $M_z/M_w$ is less than 2. Comparative example MXSTEN® CV77516 also has a single peak in the DSC (FIG. 4), however, it also has a $CDBI_{50}$ below 55 while the inventive examples have a $CDBI_{50}$ above 55.

It is seen in Table 4 the monolayer films comprising the VLDPE copolymer composition EX1 has very good film toughness (dart impact, tear and puncture resistance) and better extrusion processability (lower current requirement and lower extrusion pressure) compared to the metallocene produced VLDPE resin, Exceed™ 1015HA.

The films of the current examples were made on a blown film line manufactured by Battenfeld Gloucester Engineering Company of Gloucester, Mass. using a die diameter of 4 inches (101.6 mm), and a die gap of 35 mil (0.889 mm).

A fluoroelastomer type PPA (264 ppm of Viton® FreeFlow™ Z110 commercially available from DuPont) via a masterbatch was added to EX1 for purposes of film production. Exceed™ 1015 contained polymer processing aid was used as received. This blown film line has a standard output of about 100 pounds per hour (45.4 kg/h). Screw speed is in the range of 30 to 50 RPM. The extruder screw (barrier screw) has a 2.5 inches (63.5 mm) diameter and a length/diameter (L/D) ratio of 24/1. Melt Temperature and Frost Line Height (FLH) are in the range of 420 to 440° F. (215 to 227° C.) and 15-18 inches (0.381 to 0.457 m), respectively. The blown film bubble is air cooled. Typical blow up ratio (BUR) for blown films prepared on this line are from 2/1 to 4/1. An annular die having a gap of 35 mils (0.889 mm) was used for these experiments. The films of this example were prepared using a BUR aiming point of 2.5:1 and a film thickness aiming point of 1.0 mils (25.4 microns). Film properties were measured as described above and are reported in Table 4.

TABLE 4

Monolayer Film Characteristics

|  | Exceed 1015 | EX1 |
|---|---|---|
| Physical Properties of Comparative and Inventive Compositions: | | |
| Die Gap (mils) | 35 | 35 |
| Film guage (mil) | 1 | 1 |
| Dart Impact Strength (g/mil) | 913 | 995 |
| Tear Strength MD (g/mil) | 220 | 231 |
| Tear Strength TD (g/mil) | 333 | 395 |
| Puncture Resistance (J/mm) | 75 | 103 |
| Processability of Comparative and Inventive Compositions: | | |
| Current (A) | 46 | 38 |
| Extruder Pressure (psi) | 4583 | 3883 |
| Output (lbs/hr) | 100 | 100 |

Three Layer co-extruded films (HDPE/HDPE/VLDPE) were made with the comparative ZN VLDPE (SCLAIR® FP112-A) and inventive single site catalyzed (SSC) VLDPE EX2, and inventive SSC VLDPE EX3 while keeping the HDPE layers similar using the HDPE resin SCLAIR® 19C which is commercially available from NOVA Chemicals Corporation. The hot tack strength and heat seal strength of the comparative and inventive copolymers were compared for the multilayer films.

A three layer film structure may be described as layers A-B-C, where the internal layer B (the "core" layer) is sandwiched between two external "skin" layers A and C. In many multilayer films, one (or both) of the skin layers is made from a resin which provides good seal strength and is referred to herein as a sealant layer.

The films were made on a three layer co-extrusion film line manufactured by Brampton Engineering of Brampton, Ontario, Canada. The extrusion-blown film process is a well-known process for the preparation of multilayer plastic film. The process employs multiple extruders which heat, melt and convey the molten plastics and forces them through multiple channels in annular die. Typical extrusion temperatures are from 330 to 500° F., especially 350 to 460° F. This multi-layer blown film line has a standard output of about 100 pounds per hour (45.4 kg/h). Screw speed is in the range of 30 to 50 RPM. The straight feed extruder screws have 1.5 inches (38.1 mm) diameter and a length/diameter (L/D) ratio of 24/1. Frost Line Height (FLH) is about 19 inches (0.483 m). The blown film bubble is air cooled. Typical blow up ratio (BUR) for blown films prepared on this line are from 1.5/1 to 4/1. An annular die having a gap of 100 mils (2.54 mm) was used for these experiments. The three layer films of these examples were prepared using a BUR aiming point of 2.5:1 and a total film thickness aiming point of 2.1 mils (53.3 microns) with each layer comprising one third of the total structure.

Layer A and Layer B are conventional high density polyethylene homo-polymers having a melt index, $I_2$ of about 0.95 g/10 minutes and a density of about 0.958 g/cc (sold under the trademark SCLAIR® 19C by NOVA Chemicals Corporation) and referred to in these examples as HDPE. Layer C (Table 5) was made from the polymers/polymer blends shown in Table 5.

TABLE 5

The Three Layer Structures Evaluated for Sealing Properties

|  |  | Layer A | Layer B | Layer C |
|---|---|---|---|---|
|  | Layer ratio (wt %) | 33.3 | 33.4 | 33.3 |
| Co-ex film 1 | Materials | HDPE | HDPE | SCLAIR® FP112-A |
| Co-ex film 2 | Materials | HDPE | HDPE | EX 2 |
| Co-ex film 3 | Materials | HDPE | HDPE | EX 3 |

TABLE 6

Heat Seal Data for the Three Layer Structures

| Seal Temp (° C.) | Co-ex Film 1 Force (N) | Co-ex Film 2 Force (N) | Co-ex Film 3 Force (N) |
|---|---|---|---|
| 80 | 0.3 | 0.2 | 3.3 |
| 85 | 1.2 | 5.2 | 6.62 |
| 90 | 9.6 | 9.00 | 9.8 |
| 95 | 12.3 | 12.4 | 12.20 |
| 100 | 13.40 | 13.90 | 14.72 |
| 110 | 14.14 | 14.30 | 15.10 |

TABLE 7

SIT of the Three Layer Structures

|  | Co-ex Film 1 | Co-ex Film 2 | Co-ex Film 3 |
|---|---|---|---|
| SIT (° C.) | 87 | 84 | 82 |

TABLE 8

Hot Tack Data for the Three Layer Structures

| Seal Temp (° C.) | Co-ex Film 1 Avg. Force (N) | Co-ex Film 2 Avg. Force (N) | Co-ex Film 3 Avg. Force (N) |
|---|---|---|---|
| 75 | 0.43 | 0.38 | 0.42 |
| 80 | 0.51 | 0.43 | 0.57 |
| 90 | 1.81 | 2.37 | 1.82 |
| 95 | 3.37 | 4.89 | 3.39 |
| 100 | 4.65 | 9.29 | 5.71 |
| 105 | 5.62 | 11.35 | 8.92 |
| 110 | 5.21 | 11.27 | 8.85 |

The seal initiation temperature for inventive Example 2 and Example 3 is about 3-5° C. lower than commercial SCLAIR® FP112-A while achieving similar overall seal strengths of 14-15 N at 110° C.

Hot tack strength is the force, measured in Newtons, required to separate a hot bilayer film seal. At a temperature of about 110° C., inventive ethylene copolymers EX 2 and EX 3 show peak hot tack strengths that are more than about 70 to about 120% higher compared to the conventional Z-N resin, commercially available as SCLAIR® FP112-A. High hot tack strength is desired for example, in form-fill and seal applications, where the package contents are dropped into a bag while the seal is still hot. Since the contents can be heavy and are packaged at high speed, the high hot tack strength is desirable so that it can withstand a certain load at a high loading rate while the seal is still hot.

The present invention has been described with reference to certain details of particular embodiments thereof. It is not intended that such details be regarded as limitations upon the scope of the invention except insofar as and to the extent that they are included in the accompanying claims.

INDUSTRIAL APPLICABILITY

The present disclosure relates to ethylene copolymers, copolymer compositions and methods of making and using the same.

The invention claimed is:
1. An ethylene copolymer having
a) a density from about 0.890 to about 0.915 g/cm$^3$,
b) a molecular weight distribution $M_w/M_n$ from about 2.2 to about 4.5,
c) a molecular weight distribution $M_z/M_w$ of greater than 2, provided that when the $M_z/M_w$ is greater than 3, the copolymer further has a normal to flat comonomer distribution,
d) a CDBI$_{50}$ from about 55 to about 98, and
e) a single peak in a DSC measurement.
2. An ethylene copolymer having
a) a density from about 0.890 to about 0.915 g/cm$^3$,
b) a molecular weight distribution $M_w/M_n$ from about 2.2 to about 4.5,
c) a molecular weight distribution $M_z/M_w$ from about 2 to about 3,
d) a CDBI$_{50}$ from about 55 to about 98, and
e) a single peak in a DSC measurement.
3. An ethylene copolymer having
a) a density from about 0.890 to about 0.915 g/cm$^3$,
b) a molecular weight distribution $M_w/M_n$ of from about 2.2 to about 4.5,
c) a molecular weight distribution $M_z/M_w$ of greater than 3,
d) a normal to flat comonomer distribution,
e) a CDBI$_{50}$ from about 55 to about 98, and
f) a single peak in a DSC measurement.
4. The ethylene copolymer of claim 1 that additionally exhibits a reverse comonomer distribution.
5. The ethylene copolymer of claim 1 wherein the Melt Index, I$_2$ is from about 0.25 to about 20 g/10 min.
6. The ethylene copolymer of claim 1 wherein Melt Index, I$_2$ is from about 0.25 to about 10 g/10 min.
7. The ethylene copolymer of claim 1 wherein Melt Index, I$_2$ is from about 10 to about 20 g/10 min.
8. The ethylene copolymer of claim 1 wherein Melt Index, I$_2$ is from about 0.4 to about 10 g/10 min.
9. The ethylene copolymer of claim 1 wherein Melt Index, I$_2$ is from about 0.4 to about 2 g/10 min.
10. The ethylene copolymer of claim 1 wherein $M_w/M_n$ is from about 2.6 to about 4.5.
11. The ethylene copolymer of claim 1 wherein $M_w/M_n$ is from about 3.5 to about 4.3.
12. The ethylene copolymer of claim 1 wherein $M_w/M_n$ is from about 2.6 to about 4.3.
13. The ethylene copolymer of claim 1 wherein $M_z/M_w$ is from about 2.0 to about 2.5.
14. The ethylene copolymer of claim 1 wherein $M_z/M_w$ is from about 2.5 to about 2.8.
15. The ethylene copolymer of claim 1 wherein $M_z/M_w$ is from about 2.5 to about 3.
16. The ethylene copolymer of claim 1 wherein $M_z/M_w$ is from about 2.1 to about 2.8.
17. The ethylene copolymer of claim 1 wherein $M_z/M_w$ is from 3 to about 6.
18. The ethylene copolymer of claim 1 wherein $M_z/M_w$ is from 3 to about 5.
19. The ethylene copolymer of claim 1 wherein $M_z/M_w$ is from 3 to about 4.
20. The ethylene copolymer of claim 1 wherein $M_z/M_w$ is from 3 to about 3.5.
21. The ethylene copolymer of claim 1 wherein the DSC measurement of the copolymer shows a single peak with a shoulder.
22. The ethylene copolymer of claim 1 wherein the GPC trace of the copolymer is bimodal.
23. The ethylene copolymer of claim 1 wherein the GPC trace of the copolymer is bimodal and the two peaks are separated by a valley.
24. The ethylene copolymer of claim 1 wherein the GPC trace of the copolymer is bimodal but the two peaks may not be easily deconvoluted.
25. The ethylene copolymer of claim 1 wherein the CDBI$_{50}$ is from about 65 to about 95.
26. The ethylene copolymer of claim 1 wherein the CDBI$_{50}$ is 70 to about 85.
27. The ethylene copolymer of claim 1 wherein the CDBI$_{50}$ is greater than 75 to about 98.
28. The ethylene copolymer of claim 1 wherein the CDBI$_{50}$ is 55 to about 70.
29. The ethylene copolymer of claim 1 wherein the CDBI$_{50}$ is 70 to about 98.
30. The ethylene copolymer of claim 1 wherein G' at G"$_{(500\ Pa)}$ at 190° C. is less than 40 Pa.
31. The ethylene copolymer of claim 1 wherein G' at G"$_{(500\ Pa)}$ at 190° C. is less than 35 Pa.
32. The ethylene copolymer of claim 1 wherein G' at G"$_{(500\ Pa)}$ at 190° C. is less than 30 Pa.
33. The ethylene copolymer of claim 1 wherein G' at G"$_{(500\ Pa)}$ at 190° C. is from about 20 Pa to about 40 Pa.
34. The ethylene copolymer of claim 1 wherein G' at G"$_{(500\ Pa)}$ at 190° C. is from about 20 Pa to about 35 Pa.
35. The ethylene copolymer of claim 1 made from ethylene and one or more C$_{3-12}$ alpha olefin comonomers in a continuous polymerization process.
36. The ethylene copolymer of claim 35, wherein the continuous solution polymerization process comprises at least two polymerization reactors.
37. The ethylene copolymer of claim 35, made from ethylene and one or more C$_{3-12}$ alpha olefin comonomers in a polymerization process using at least one single site catalyst.
38. The ethylene copolymer of claim 37 wherein the single-site catalyst is selected from catalysts of the formula:

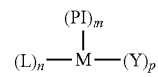

wherein M is a group 4 metal;
PI is a phosphinimine ligand;
L is a monoanionic ligand selected from the group consisting of a cyclopentadienyl-type ligand;

Y is an activatable ligand;

m is 1 or 2;

n is 0 or 1; and p is an integer and the sum of m+n+p equals the valence state of M.

39. The ethylene copolymer of claim 35 wherein the continuous solution polymerization process comprises
    a first stirred tank polymerization reactor having a mean reactor temperature of from about 100° C. to less than about 140° C., and,
    a second stirred tank reactor having a mean temperature of at least about 20° C. greater than the mean reactor temperature of the first reactor.

40. The ethylene copolymer claim 39 wherein the first stirred tank polymerization reactor has a mean reactor temperature of from about 120° C. to less than about 138° C.

41. The ethylene copolymer claim 39 wherein the first stirred tank polymerization reactor has a mean reactor temperature of from about 130° C. to less than about 137° C.

42. The ethylene copolymer of claim 37 wherein the single site catalyst is in the first reactor.

43. A polymer composition comprising the ethylene copolymer of claim 1.

44. A blend polymer composition comprising the ethylene copolymer of claim 1 blended with one or more of LDPE, LLDPE, HDPE, VLDPE, or ULDPE.

45. A monolayer film comprising polymer composition of claim 43.

46. A multilayer film, containing at least one layer comprising the polymer composition of claim 43.

47. A packaging article comprising the polymer composition of claim 43.

* * * * *